United States Patent [19]

Farwer

[11] Patent Number: 5,210,388
[45] Date of Patent: May 11, 1993

[54] INERT GAS FOR TIG, MIG, MAG AND PLASMA WELDING

[75] Inventor: Alfward Farwer, Meersbusch, Fed. Rep. of Germany

[73] Assignee: Messer Griesheim GmbH, Frankfurt, Fed. Rep. of Germany

[21] Appl. No.: 844,210

[22] Filed: Mar. 2, 1992

[30] Foreign Application Priority Data

Mar. 5, 1991 [DE] Fed. Rep. of Germany ....... 4106900

[51] Int. Cl.$^5$ ................................................ B23K 9/16
[52] U.S. Cl. .................... 219/74; 219/137 R
[58] Field of Search ............................ 219/74, 137 R

[56] References Cited

FOREIGN PATENT DOCUMENTS 1215835 11/1963 Fed. Rep. of Germany ........ 219/74
46-43287 12/1971 Japan ..................................... 219/74
48-37339  6/1973 Japan .

Primary Examiner—Clifford C. Shaw
Attorney, Agent, or Firm—Connolly & Hutz

[57] ABSTRACT

Argon having a high degree of purity or else a mixture having a high degree of purity consisting of argon, helium, hydrogen, oxygen and/or carbon dioxide are used as the inert gas for TIG, MIG, MAG and plasma welding. For purposes of improving the welding result, 80 ppm to 250 ppm, preferably 120 ppm to 180 ppm of nitrogen are added to the inert gas.

8 Claims, No Drawings

INERT GAS FOR TIG, MIG, MAG AND PLASMA WELDING

BACKGROUND OF INVENTION

For the most part, pure argon or a gas mixture containing argon and helium, hydrogen, oxygen and carbon dioxide is used for TIG, MIG, MAG and plasma welding. This process calls for an inert gas with a high degree of purity because impurities such as, for example, moisture, can lead to serious welding flaws. Commercially available welding argon, for instance, has a degree of purity higher than 99.996 percent, that is to say, the sum of all impurities can amount to 40 ppm at the maximum. The same applies for mixtures of argon and helium. As long as the inert gas mixture does not contain any helium, the proportion of argon is above 50 percent, in most applications, it lies at 80 to 90 percent. In the case of mixtures containing helium, the proportion of argon usually amounts to 50 percent, and sometimes helium proportions above 50 percent are employed.

Considerations from the point of view of metallurgy and process technology are the decisive factors in the selection of the inert gas. Since this entails observing a number of partially conflicting criteria, this necessarily calls for compromise. Important criteria in the selection of the inert gas for TIG welding are, for example, ignition behavior, electrode strength, arc stability, fusion penetration profile, viscosity of the melt and metallurgical properties of the melt.

SUMMARY OF INVENTION

The invention is based on the task of improving the welding properties of these inert gases or inert gas mixtures.

DETAILED DESCRIPTION

It has been surprisingly found that advantageous effects result from the admixture according to the invention of small amounts of nitrogen which lie, on the one hand, well above the maximum level of impurities permissible for the inert gas and, on the other hand, well below the usual admixture amounts of gas mixtures. Consequently, the leeway for the nitrogen addition is very limited and ranges from 80 ppm at the minimum and 250 ppm at the maximum. Preferably the range is from 120 ppm to 180 ppm.

It has been surprisingly found that, as a result of these relatively small admixtures of nitrogen, it is possible to achieve improvements in terms of process technology with which the detrimental effects (in metallurgical terms) caused by nitrogen do not occur. This applies not only for steel, but also for copper, nickel and aluminum. A special advantage of the inert gas according to the invention is an intensification of fusion penetration without a deterioration of the constrained position behavior.

The mixture is not suitable for the so-called gas-sensitive materials, namely, titanium, niobium, tantalum and molybdenum, for which the known standard degrees of purity such as, for instance, 99.996 percent for welding argon, are not sufficient.

The current technical possibilities allows us to produce the inert gas according to the invention as a ready mixture on an industrial scale, or users can admix it in the form of concentrates in central supply systems.

What is claimed is:

1. In an inert gas for TIG, MIG, MAG and plasma welding consisting of a mixture of argon and of one or more components selected from the group consisting of hydrogen and carbon dioxide, the improvement being an admixture of 80 ppm to 250 ppm of nitrogen to the gas whereby said inert gas consists solely of nitrogen and argon and hydrogen and/or carbon dioxide.

2. Inert gas according to claim 1, characterized by an admixture of 120 ppm to 180 ppm of nitrogen.

3. In a process for TIG, MIG, MAG and plasma welding of copper or nickel with an inert gas consisting of argon or with an inert gas consisting of argon and one or more components selected from the group consisting of helium, hydrogen, oxygen and carbon dioxide, the improvement being in that 80 ppm to 250 ppm of nitrogen are admixed to the inert gas.

4. Process according to claim 3, characterized in that 120 ppm to 180 ppm of nitrogen are admixed to the inert gas.

5. Process according to claim 3 characterized in that one or more of the components is selected from the group consisting of helium, hydrogen and carbon dioxide.

6. In a process for MAG and plasma welding of aluminum with an inert gas consisting of argon and one or more components selected from the group consisting of helium, hydrogen, oxygen and carbon dioxide, the improvement being in that 80 ppm to 250 ppm of nitrogen are admixed to the inert gas.

7. Process according to claim 6, characterized in that 120 ppm to 180 ppm of nitrogen are admixed to the inert gas.

8. Process according to claim 6, characterized in that one or more of the components is selected from the group consisting of helium, hydrogen and carbon dioxide.

* * * * *